United States Patent [19]

Fontenot

[11] 4,130,960

[45] Dec. 26, 1978

[54] FISHING ROD AND HANDLE

[75] Inventor: Carl E. Fontenot, Lake Charles, La.

[73] Assignee: Bass Handler Products Co., Inc., Lake Charles, La.

[21] Appl. No.: 783,992

[22] Filed: Apr. 4, 1977

Related U.S. Application Data

[63] Continuation-in-part of Ser. No. 635,578, Nov. 28, 1975, abandoned.

[51] Int. Cl.[2] .................... A01K 87/00; A01K 87/04
[52] U.S. Cl. ...................................... 43/18 R; 43/23; 43/24
[58] Field of Search ................... 43/18 R, 22, 23, 24

[56] References Cited

U.S. PATENT DOCUMENTS

| 2,503,510 | 4/1950 | Rives | 43/22 |
| 2,547,655 | 4/1951 | Mullins | 43/23 |

*Primary Examiner*—Russell R. Kinsey
*Assistant Examiner*—Daniel J. Leach
*Attorney, Agent, or Firm*—Fulbright & Jaworski

[57] ABSTRACT

A fishing rod and handle are disclosed in which there is no twisting of the rod in the fisherman's hand while handling a large fish; no twisting of the eyes of the rod; longer, smoother, and more accurate casts can be made; and in which friction and line wear are reduced. The fishing rod and handle comprise a rod, the handle having a lower portion and an upwardly extending forward portion, means for securing a reel of fishing line to the lower portion, means for securing the rod to the upper end of the forward portion, and the upwardly extending forward portion having an opening therethrough below the rod. Downwardly extending eyes are secured to the rod and spaced along its length and adjacent its tip, so that the fishing line extends from the reel, through the opening and through the eyes below the rod in a substantially straight line. The opening is an inverted elongate triangle preferably having rounded corners with its altitude extending lengthwise and shaped so that it accommodates fishing lines from various reels without the line rubbing against sides of the opening with the pole in all normal fishing positions, and when the reel is full or not full of line. Other features and details are disclosed below.

6 Claims, 6 Drawing Figures

U.S. Patent   Dec. 26, 1978   Sheet 1 of 2   4,130,960
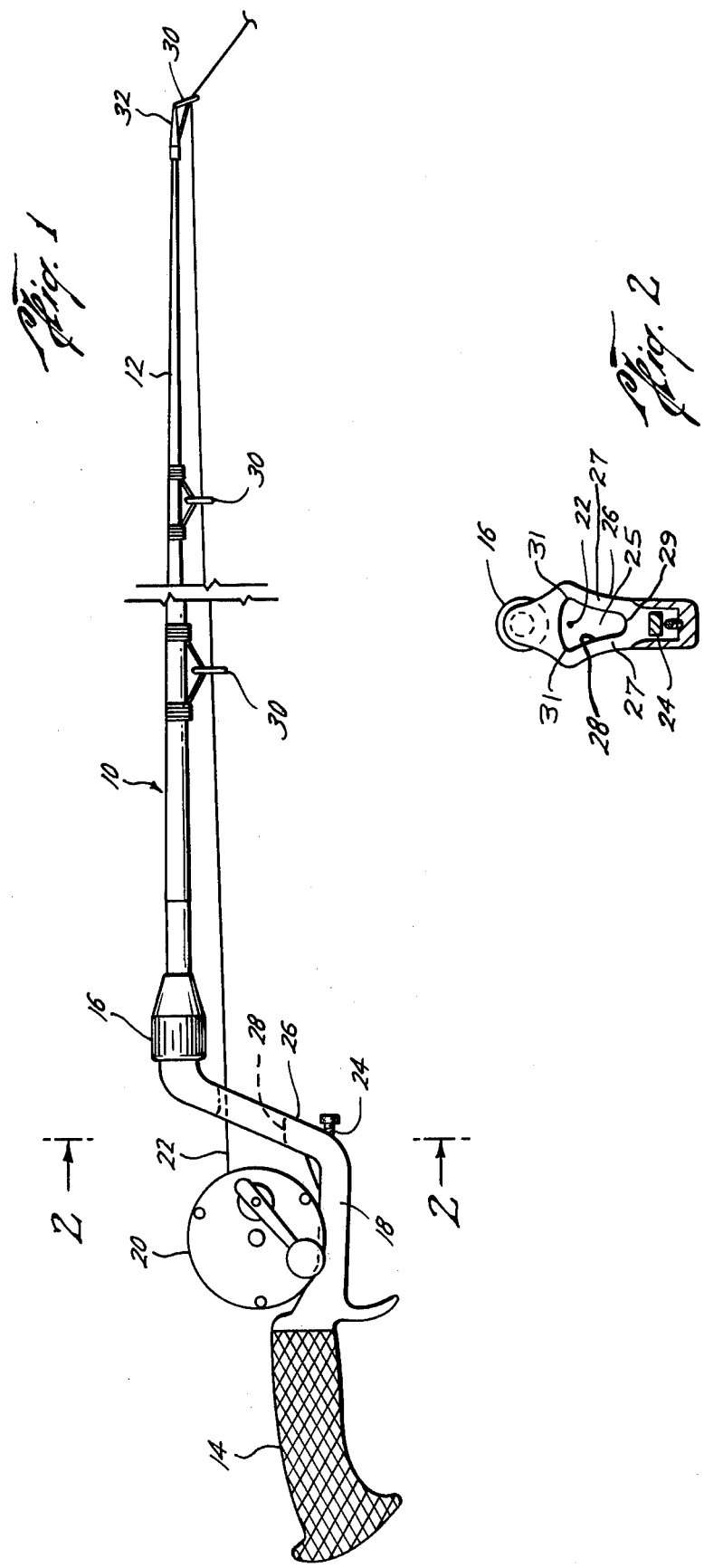

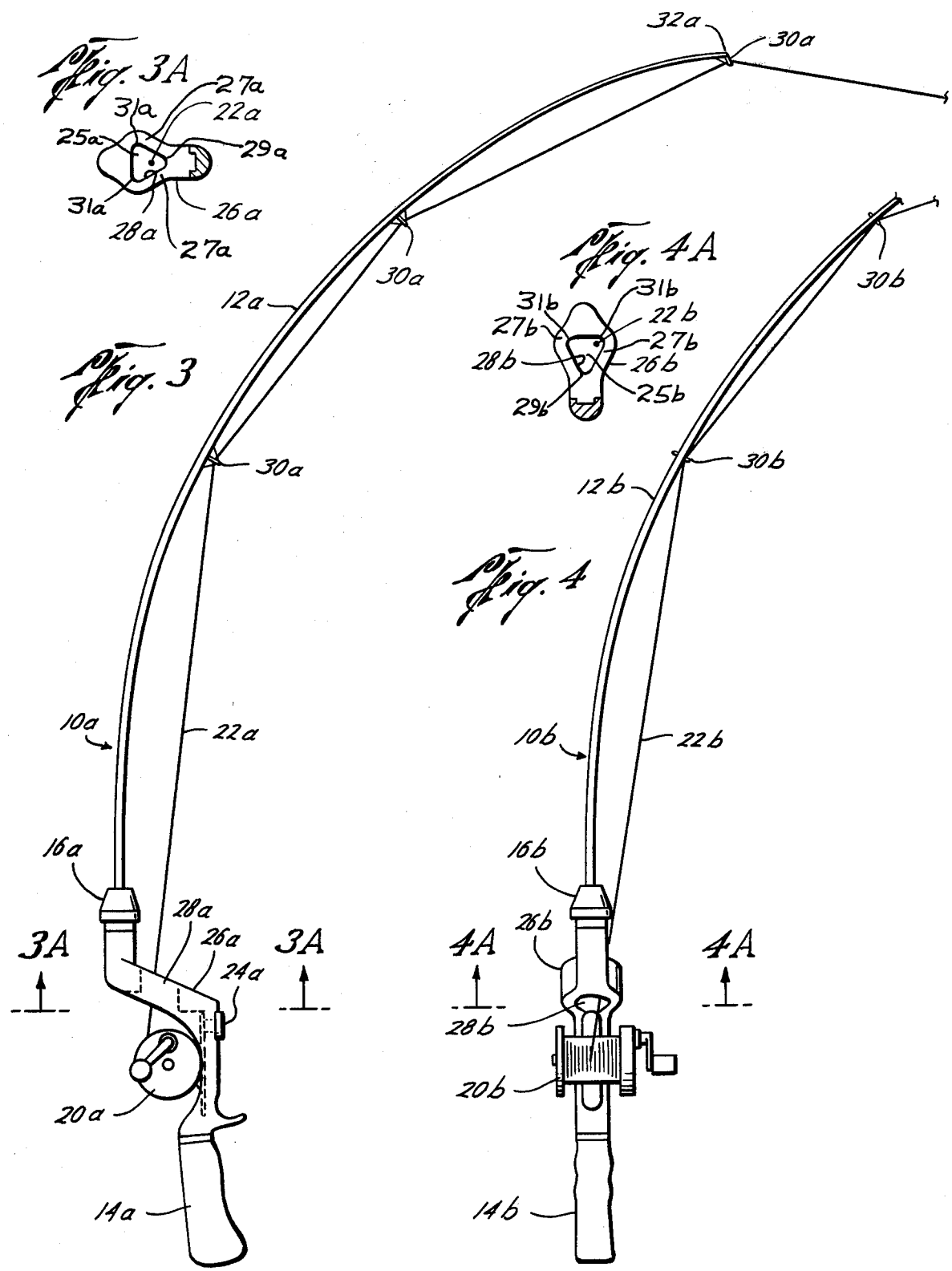

FISHING ROD AND HANDLE

CROSS-REFERENCE TO RELATED APPLICATIONS

The present application is a continuation-in-part of application Serial No. 635,578, filed Nov. 28, 1975, now abandoned.

BACKGROUND OF THE INVENTION

In prior fishing rods there has been and is a problem with twisting of the rod in the fisherman's hand while handling a relatively large fish, and twisting of the eyes on the rod. There has been and is considerable friction and line wear by the fishing line coming in contact with the rod. Also, it is highly desirable to provide a fishing rod by which longer and more accurate casts can be made than those currently available. U.S. Patents disclosing various fishing rods are: 553,055; 1,149,131; 1,409,292; 1,478,643, 1,595,275; 2,503,510; 2,547,655; 2,776,516; 3,102,358; 3,279,116; and 3,421,428. None of these patents, however, discloses or suggests the fishing rod and handle of the present invention by which the advantageous results set forth throughout are obtained.

SUMMARY

The present invention is directed to a fishing rod and handle in which twisting of the rod in the hand of the fisherman while handling a fish and twisting the eyes on the rod are eliminated; the line does not engage sides of the opening in the riser section through which it extends and thus friction and line wear are reduced; longer and more accurate casts are possible; there is no restriction providing for smoother flow of the line through the riser opening thereby eliminating backlasher; which can accommodate any casting or spin-casting reel on the market; and which is relatively inexpensive to manufacture.

Accordingly, it is an object of the present invention to provide a fishing rod and handle in which twisting of the rod in the fisherman's hand while handling a large fish is minimized.

It is a further object of the present invention to provide such a fishing rod and handle in which there is no twisting of the eyes on the rod.

A further object of the present invention is the provision of such a fishing rod and handle in which much longer, smoother and more accurate casting is obtained.

A further object of the present invention is the provision of such a fishing rod and handle in which there is a more comfortable feel for the fisherman, better balance, and more convenient storage in rod holders than conventional rods and handles.

Further object of the invention is the provision of such a fishing rod and handle which has an inverted triangular opening in the riser of the handle through which the line extends without touching its sides thereby reducing line wear, providing unrestricted and smooth line flow off the reel and smoother and longer casts without backlash, which accommodated all present-day casting and spin-casting reels, and which is relatively inexpensive to manufacture.

In summary, the fishing rod and handle includes a rod, the handle having a lower portion and an upwardly extending forward or riser portion, means for securing a reel of fishing line to the lower portion, means for securing the rod to the upper end of the foward portion, and the upwardly extending forward portion has an opening therethrough below the rod. The eyes secured to the rod extend downwardly and are spaced along its length and adjacent its tip and the fishing line extends from the reel through the opening and through the eyes below the rod, in a straight line and out of contact with the rod. The opening in the forward portion or handle is triangularly shaped, preferably with rounded corners, and is of a size to accommodate fishing line from various reels without the line rubbing sides of the opening.

Other objects and details will appear throughout.

BRIEF DESCRIPTION OF THE DRAWINGS

FIG. 1 is a side view of a fishing rod and handle according to the invention.

FIG. 2 is a view taken along the line 2—2 of FIG. 1.

FIG. 3 is a side view of another embodiment of the invention illustrating the pole bent in a vertical direction.

FIG. 3A is a sectional view taken along the line 3A—3A of FIG. 3.

FIG. 4 is a top view of the embodiment of FIG. 3 illustrating the pole bent in a sidewise direction.

FIG. 4A is a sectional view taken along the line 4A—4A of FIG. 4.

DESCRIPTION OF THE PREFERRED EMBODIMENTS

Referring now to the drawings, and particularly to FIG. 1-2, a fishing rod and handle generally designated by the reference numeral 10 is illustrated and includes the rod 12 secured to the handle 14 by the securing means 16 in the usual manner.

The handle 14 includes a lower portion 18 to which a reel 20 of fishing line 22 is secured by the securing means 24 in the usual manner. Since the rod 12 and the reel 20 can be secured to the handle 14 in any desired manner, and preferably, in the conventional manner to provide a minimum change to currently available fishing rods and handles, no further description thereof is deemed necessary or given. The handle 14 includes the integrally-formed upwardly extending forward portion or riser 26 which includes a pair of spaced legs 27 providing an opening 25 in the form of an inverted, elongate triangle, with a rounded bottom 29 and preferably with the rounded upper corners 31. The altitude of the opening 25 extends lengthwise and the opening 25 is of a size sufficient to accommodate casting and spin casting reels without the fishing line 22 rubbing against the inner sides 28 of the legs 27 as seen in FIG. 2.

The fishing rod 12 has the customary eyes 30 spaced along its length and at its tip 32, except the eyes extend downwardly rather than upwardly.

Preferably, the opening 28 through the upwardly extending lower portion 26 on the handle 14, and the opening through the eyes 30 are such that the fishing line 22 extends through them in a substantially straight line and is spaced below the fishing rod 12.

The foregoing arrangement provides for a minimum amount of wear on the fishing line 22, eliminates twisting of the rod in the fisherman's hand while handling a fish, eliminates twisting of the eyes when the rod is arched, and has better balance, since the center of gravity has been lowered, the fishing line 22 does not engage or rub against the fishing rod 12 and does not engage or rub against the sides of the opening 28 in all normal fishing portions of the rod 12 which results in smooth, unrestricted flow of the line 22 from the reel 20 without backlashes, longer and straighter casts, and reduces wear and tear on the line 22 and handle 14.

The significant feature of the fishing line 22 not rubbing against the inner sides 28 of the legs 27 of the opening 25 in the riser portion 26 of the handle are best illustrated in FIGS. 3, 3A, 4, and 4A, to which reference is now made. The embodiments illustrated in these figures are modified slightly from that disclosed in FIGS. 1 and 2, and, for convenience, the reference numerals "a" and "b" have been added to numerals designating corresponding parts in FIGS. 3 and 3A and 4 and 4A, respectively. Modifications are simply that the inner sides 28a and 28b of the opening 25a and 25b generally straight rather than bowed slightly inwardly as illustrated in FIGS. 1 and 2, a differently-shaped handle 14a and 14b and means for mounting 24a (not shown in FIG. 4) the reel 20a and 20b, and means for mounting 16a and 16b, the pole 10a and 10b are illustrated. The other structure is the same and the fishing line 22 in FIGS. 1 and 2 extends through the opening 25 in the same position as that illustrated in FIGS. 3, 3A 4 and 4A.

Referring now to FIGS. 3 and 3A, the fishing pole 12a is illustrated bent or arched vertically in a position when reeling in a large fish. Even though the pole 12a is bent or arched considerably, it is seen from FIG. 3A that the fishing line 22a is well away from any of the sides or top or bottom of the opening 28a. Thus, there is no rubbing of the fishing line 22a on the sides 27a of the opening 25a with the advantages flowing therefrom as previously mentioned.

FIGS. 4 an 4A illustrate the position of the fishing pole 12b and fishing line 22b when the pole is bent to the side when reeling in a fish. Here again, as best illustrated in FIG. 4a, the fishing line 22b does not rub against or touch the sides 27b of the opening 25b.

The remaining parts and operation of the embodiments illustrated in FIGS. 3, 3A, 4 and 4A are the same as in FIG. 1 and the fishing line 22a and 22b is in a straight line when the pole 12a and 12b is not arched or bent as illustrated in FIG. 1 with all the resulting advantages. Accordingly, no more description is deemed necessary or given of the embodiments of FIGS. 3, 3A, 4 and 4A.

While the fishing rod and handle have been disclosed as a casting reel 20, it may also be utilized with spin-cast reels, the opening 28 being of a size sufficient to permit a generally straight line from the reel 20, 20a and 20b to the eye 30, 30a and 30b and the fishing line 22, 22a and 22b does not rub against the sides 28, 28a and 28b of the opening 25, 25a and 25b in all normal fishing positions of the fishing rod 12, 12a and 12b.

While the fishing rod 12 and handle 14 are disclosed primarily for fresh water fishing, it is applicable to both saltwater and deepsea fishing with the aforementioned advantages and features.

Accordingly, the present invention is well suited and adapted to attain the objects and ends and has the advantages and features mentioned as well as others inherent therein.

While presently preferred embodiments have been given for the purposes of disclosure, changes may be therein which are within the spirit of the invention as defined by the scope of the appended claims.

What is claimed is:
1. A fishing rod comprising,
   a rod,
   downwardly extending eyes secured to the rod and spaced below and along its length and adjacent its tip,
   a handle having a lower portion and an integrally formed forward portion extending upwardly and forwardly from the lower portion,
   means for securing a reel of fishing line to the lower portion, and
   means for securing the rod to the upper end of the forward portion,
   the forward portion including a pair of spaced legs providing an inverted, generally triangularly shaped opening with a rounded bottom and its altitude lengthwise extending therethrough below the rod in alignment with the eyes sufficient to allow the fishing line to extend therethrough without the fishing line rubbing sides of the opening in all fishing positions of the fishing line and rod.
2. The fishing rod of claim 1 where,
   the opening and eyes are aligned in substantially a straight line when the rod is straight.
3. The fishing rod of claim 1 where, the opening has generally rounded upper corners.
4. The fishing rod of claim 1 where, the opening has generally rounded upper corners, and
   the opening and the eyes are aligned in substantially a straight line when the rod is straight.
5. A handle for a fishing rod comprising,
   a handle having a lower portion and an integrally formed portion extending upwardly and forwardly from the lower portion,
   means for securing a reel of fishing line to the lower portion,
   means for securing a rod with its eyes extending downwardly to the upper end of the forward portion,
   the forward portion including a pair of spaced legs providing and inverted generally triangularly shaped opening with a rounded bottom and its altitude lengthwise extending therethrough below the means for securing the rod to its upper end sufficient to allow the fishing line to extend therethrough and through the eyes without the fishing line rubbing sides of the opening in all fishing positions of the rod when connected to the forward portion of the handle.
6. The handle of claim 5 where,
   the opening and means for securing the reel are arranged to permit the fishing line to extend through the opening and the eyes in a straight line when the rod is straight.

* * * * *